Figure 1:
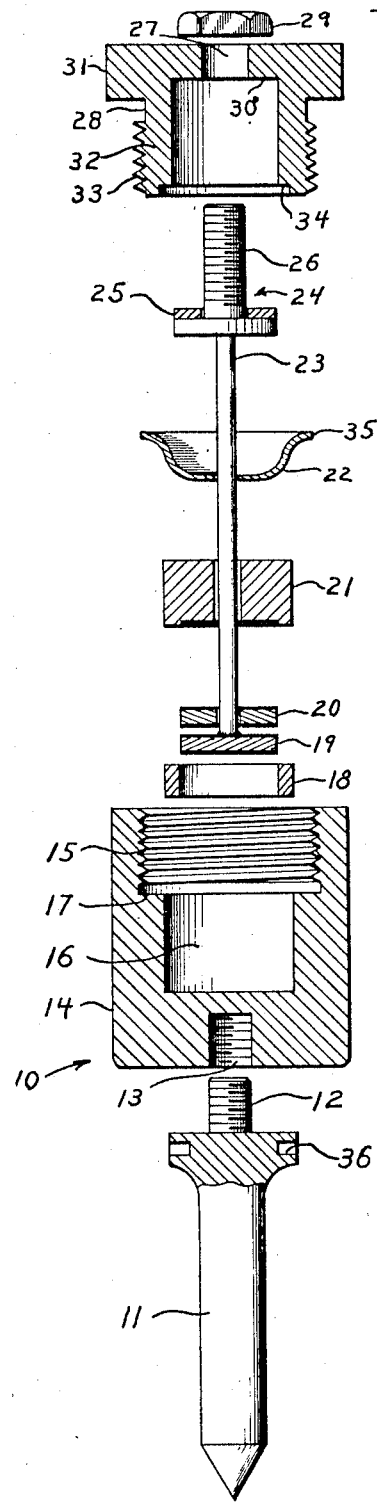

Aug. 18, 1964

C. W. DICKEY 3,145,311

VIBRATION PICK-UP DEVICE

Filed March 2, 1961

INVENTOR

CLYDE W. DICKEY

BY Robert B. Harmon

ATTORNEY

United States Patent Office 3,145,311
Patented Aug. 18, 1964

3,145,311
VIBRATION PICK-UP DEVICE
Clyde W. Dickey, State College, Pa., assignor to HRB-Singer, Incorporated, State College, Pa., a corporation of Delaware
Filed Mar. 2, 1961, Ser. No. 92,919
6 Claims. (Cl. 310—8.4)

This invention relates to vibration measuring instruments generally, and more particularly to an improved vibration pick-up device which is capable of sensing and converting vibratory energy into electrical energy to provide information relative to the vibration characteristics of a machine or similar object of manufacture.

In the design of machinery and various similar items of manufacture, accurate information relating to the vibrational characteristics of the article is of prime importance, for these vibrational characteristics relate directly to such factors as the structural durability and the operational noise output of the product.

To meet the demand for instruments capable of providing an indication of the vibrational characteristics of an object, a large variety of vibration measuring instruments have previously been developed. Many of these instruments employ a simple vibration pick-up unit incorporating sensing elements wherein blocks of piezoelectric material are secured to one face of a base plate which is in turn secured to a vibrating body. If a force is applied vertically to the base plate, the piezoelectric body is accelerated and expansion or contraction along the length of the block occurs, thus causing an electrical signal which may be carried from the body by suitable electrodes. In "free" ended devices of this type, the only possible reaction which takes place is that of inertia, and thus, vibration sensing instruments of the "free" ended variety are inertia driven devices. Since piezoelectric elements have low tensile strengths, it is a common practice to compressively load the piezoelectric block to achieve greater strength for the sensing of vibrations or accelerations of high magnitude. The introduction of a loading spring to compressively load the piezoelectric sensing element has caused serious limitations in the capabilities of the vibration measuring instruments of the prior art.

The practical applications of vibration measuring instruments require that these instruments operate over extremely broad band widths by comparison to other acoustic devices. The sensitivity of piezoelectric sensing elements is proportional to the thickness to area ratio of the elements, yet to fulfill high frequency requirements, this thickness to area ratio cannot be too large, for wide band operation calls for a high degree of stiffness and a high resonant frequency. For low frequency operations, a high capacity is required, thus making the use of high capacity piezoelectric bodies desirable. The nature of the spring utilized to provide the compressive loading of the piezoelectric sensing block now becomes of utmost importance, as this spring directly affects the frequency limitations of the vibration sensing instrument.

Vibration measuring instruments and accelerometers now commercially available employ, practically without exception, coil or flat springs to load the piezoelectric sensing element. The shunt compliance contributed by the spring directly affects the sensitivity of the piezoelectric sensing element, and the upper frequency range of the measuring device is limited by the multiple degrees of freedom in the spring. Stiff coil springs of a few turns exhibit axial nodes and nodes along the diameter of the spring which are caused by difficulties in achieving plane parallel ends. Flat springs also exhibit multiple nodes, while long multi-turn coils have diametrical nodes and a reduced stiffness which reduces the upper frequency range of the instrument.

A primary object of this invention is to provide an improved vibration pick-up device of the inertia driven variety.

Another object of this invention is to provide a vibration pick-up device of the inertia driven variety which has a very high natural frequency and is susceptible to a minimum of spurious resonances.

A further object of this invention is to provide a vibration pick-up device of the inertia driven variety capable of providing indications over a broad dynamic range.

Another obejct of this invention is to provide a vibration pick-up device of the inertia driven variety which incorporates a novel loading spring construction to minimize spurious resonances.

A still further object of this invention is to provide a vibration pick-up device of the inertia driven variety wherein the inertial elements are held in nearly perfect axial symmetry to reduce spurious responses caused by non-axial excitations.

Figure 2:
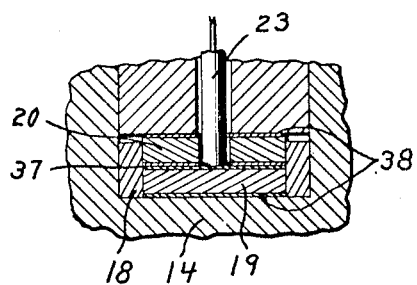
Figure 3:
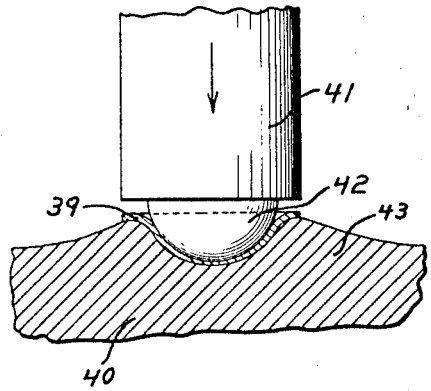

The above and further objects and details of the invention will be readily apparent upon a consideration of the following specification taken with the accompanying drawings in which:

FIGURE 1 is an exploded view of the vibration pick-up device of the present invention shown in axial section, and FIGURE 2 illustrates the piezoelectric sensing unit of FIGURE 1, drawn to larger scale for increased clarity, and FIGURE 3 illustrates the molding apparatus for forming the loading spring of FIGURE 1.

Referring now to FIGURE 1, the vibration pick-up device of the present invention, indicated generally at 10, includes a sensing probe 11 which is provided at one end with an upstanding threaded stud 12. Threaded stud 12 is adapted for insertion into a threaded aperture 13 provided in the bottom wall of a cup-shaped housing 14. Housing 14 is provided with a threaded, internal, upper section 15 and a non-threaded, lower, internal section 16. Lower internal section 16 is of a lesser diameter than upper internal section 15 to provide a seat 17 which extends around the inner circumference of the housing 14. Lower internal section 16 is adapted to receive the inertia driven assembly of the pick-up device 10 which includes a circular insulator 18, two piezoelectric discs 19 and 20, a circular backing block 21, and a bell-shaped spring 22. The circular insulator 18 is adapted to surround the piezoelectric discs 19 and 20 when they are positioned within the section 16. The piezoelectric disc 20, the backing block 21, and the bell-shaped spring 22 are all provided with a centrally located aperture through which passes a conductor element 23. One end of conductor 23 is centrally attached to the upper surface of the piezoelectric disc 19, while the opposite end of the conductor is attached to a connector 24. Connector 24 includes an integral circular head 25 in the form of a lock washer, and an upstanding threaded terminal stud 26 which is adapted to extend through an aperture 27 in the top of a cap unit 28. A lock nut 29 may be threaded onto the stud 26 to hold lock washer 25 securely against the inner face 30 of the cap 28. Cap 28 is provided with an enlarged circular head 31 and a depending circular section 32 which is of lesser diameter than the head 31. Depending section 32 is provided with external threads 33, and the lower surface thereof is cut-away to provide a circular seat 34. Circular seat 34 is capable of receiving a circular flange 35 which extends about the upper portion of the spring 22.

In assembling the vibration pick-up device of FIGURE 1, the connector 24 with the lock washer 25 is inserted into the cap 28, and the nut 29 is started on the projecting end of the threaded stud 26. The depending threaded portion 32 of the cap 28 is then threaded into the upper threaded section 15 of the housing 14. As the cap 28 is progressively threaded onto the housing 14, the upper flange 35 of the spring 22 seats in the seat 34, and the spring forces the backing block 21 and the piezoelectric discs 19 and 20 together within the lower section 16 of the housing 14. After the cap 28 is secured tightly to the housing 14, the connector stud 26 may be pulled up and held while the nut 29 is tightened against the cap 28. The probe 11 is then threaded into the bottom of the housing 14 by any suitable means. Probe 11 may be provided with apertures 36 to receive a spanner wrench or other suitable tightening tool.

In operation, the probe 11 is placed against a body, the vibratory characteristics of which are to be measured. Mechanical vibrations are transmitted from the body through the probe 11 to the housing 14, thereby accelerating the housing. This acceleration of the housing 14 places the piezoelectric discs 19 and 20 under stress, as the backing block 21 tends to remain at rest due to inertia. The discs 19 and 20 are caused to introduce a varying electrical potential indicative of the mechanical vibrations experienced by the housing 14 in the conductor 23, which in turn, passes this electrical signal to the connector terminal stud 26. The connector terminal stud 26 may be electrically connected to any suitable indicating instrument.

FIGURE 2 illustrates the orientation of the inertia driven vibration sensing components of the vibration pick-up device 10 within the lower section 16 of the housing 14. The piezoelectric discs 19 and 20 are poled discs of ceramic transducer material, and preferably consist of flat discs of barium titanate which provides the necessary capacity for low frequency operation. The positive pole faces 37 and the negative pole faces 38 of the discs 19 and 20 are silver coated to permit direct solder bonds and to enhance electrical shielding. The positive pole face of disc 19 is placed in juxtaposition with the positive pole face of disc 20, while the negative pole faces 38 of the discs 19 and 20, which are at natural ground potential, form an effective electrical shield about the outer side of the disc assembly to protect the assembly from stray resonances such as those caused by machine motor fields. The mating of the positive pole faces 37 concentrates the capacity of the discs 19 and 20 and provides a disc assembly having a capacitance which is double that of a single disc assembly. The conductor 23 of FIGURE 1, which comprises a thin insulated wire, passes through the central aperture of the piezoelectric disc 20 and is tip soldered at the center of the positive pole face of the disc 19. The backing block 21 is tensioned by the spring 22 to hold the discs 19 and 20 tightly within the housing 14. Glycerin may be used between the discs 19 and 20 and the disc 20 and the backing block 21 to tightly couple these components.

It is obvious from FIGURES 1 and 2 that the vibration pick-up device of the present invention includes components which are arranged in nearly perfect axial symmetry. The provision of the aperture in the upper piezoelectric disc 20 through which the conductor 23 extends, eliminates the radially extending conductors of prior measuring devices and enhances the axial symmetry of the vibration pick-up assembly. This overall axial symmetry of the vibration pick-up of FIGURE 1 eliminates the resonances inherent in the axially non-concentric vibration measuring instruments of the prior art.

As previously mentioned, the construction of the spring utilized to load the piezoelectric sensing section of a vibration measuring instrument is of critical importance, as the spring directly affects the frequency sensitivity of the instrument. The bell-shaped spring 22 of FIGURE 1 is, therefore, a critical element in eliminating spurious resonances which would arise from the utilization of a spring having many degrees of freedom.

In the formation of the spring 22, it is desirable to impart maximum stiffness to the sides of the spring to accomplish controlled side wall elasticity.

If the bowl-like spring 22 of FIGURE 1 were formed by a deep drawn process, the sides of the spring would be stretched out and deformed in areas of small radius, and the desired stiffness would not be obtained.

By utilizing a hydroform method, a bowl-shaped spring having the necessary degree of side wall stiffness could be obtained, but the production of a small spring would not justify the expense of the hydroform process.

Therefore, the spring 22 of FIGURE 1 is produced by a combined deep draw and hydroform process as illustrated by FIGURE 3. By this process, a spring disc 39 is pressed into a block of semi-rigid plastic material, such as lead, by a rigid punch 41. Punch 41 is provided with a head 42 which is formed to the desired inside contour of the spring. As the punch 41 forces the spring disc 39 into the semi-rigid material 40, the material rolls upwardly, as at 43, causing the spring material of the disc 39 to roll up onto the side structure thereof with a minimum of material stretching. The bottom portion of the spring is formed with minimum thickness and has no forces, while a high degree of stiffness is imparted to the side portions of the spring. The spring formation by this combined process minimizes the separation of crystals within the spring structure and thus minimizes the requirement of subsequent heat treatment. This factor is important, as spring alloys should not be subjected to numerous heat treatments, for these treatments tend to cause precipitation of the inherent material within the alloys and a change of alloy composition.

It is, therefore, apparent that the spring 22 is a combination of a deep drawn and hydro-formed cup with a flange 35, and employs a shape factor of only one predominate radial mode of extension. Bending or flexing of the spring may occur over the whole side area thereof, but other possible modes are destroyed by continuously varying the mechanical impedance by virtue of geometry, hardness and stress distribution. The spring is cold formed at temperatures below the recrystallization temperature of the metal utilized for forming the spring, and is therefore, stable at room temperature. Heat treated springs previously employed tended to relax at room temperature and thereby affect the dynamic range of the vibration measuring instrument. The spring 22 of the present invention is formed from suitable solution annealed spring alloys which may include Phosphor bronze or certain nickel chromium alloys. However, spring 22 is preferably formed from beryllium copper, which exhibits excellent controlled cold-working properties and superior strength. Maximum stiffness is imparted, during the forming process, to the sides of the bowl portion of the spring 22, thereby favoring a high degree of stiffness to forces applied axially to the spring. Stresses applied other than axially are effectively dissipated by the spring. The spring 22 provides consistent uniformity of spring tension, maximum stiffness, and long-time tension and dimensional stability. Such properties are difficult to obtain in heat treated coil or flat springs. Due to the high degree of stiffness incorporated in the spring 22 of the present invention, the vibration pick-up device 10 has the high natural frequency of 90,000 cycles per second. The coil and flat spring designs of previous vibration measuring instruments have limited the natural frequency of these instruments to much lower ranges.

It will be readily apparent to those skilled in the art that this invention provides a novel and improved vibration pick-up device capable of measuring vibrations over a wide dynamic range. The arrangement and types of components utilized within this invention may be subject to numerous modifications well within the purview of this inventor, who intends only to be limited to liberal interpretation of the specification and appended claims.

What is claimed is:
1. A vibration pick-up device of the inertia driven variety for detecting the vibrational characteristics of a vibrating body comprising; a housing, means to transmit mechanical vibrations from said body to the housing, sensing means within said housing for converting said mechanical vibrations into an electrical signal, a conductor for transmitting the signal from said sensing means, and a single bell shaped biasing means for applying pressure to said sensing means, said biasing means being circumferentially seated within said pick-up device and responsive only to forces applied axially of said pick-up device.

2. A vibration pick-up device of the inertia driven variety for detecting the vibrational characteristics of a vibrating body comprising; a housing, inertia driven sensing means seated within said housing for converting said mechanical vibrations into an electrical signal, said sensing means including two discs of poled piezoelectric material and a backing block abutting one of said discs, a conductor for transmitting the signal from said sensing means, and a single biasing spring for applying pressure to said sensing means, said biasing spring including an upper flange seated against said housing and a bowl-shaped section depending from said upper flange, the lower surface of said bowl-shaped section abutting said backing block, said bowl-shaped section having stiffened sidewalls of a thickness greater than that of the lower surface of said section whereby a shape factor of only one predominate radial mode of extension is imparted to said biasing spring.

3. A vibration pick-up device of the inertia driven variety for detecting the vibrational characteristics of a vibrating body comprising; a housing, means to transmit mechanical vibrations from said body to the housing, inertia driven sensing means seated within said housing for converting said mechanical vibrations into an electrical signal, said sensing means including two discs of poled piezoelectric material symmetrically arranged in juxtaposition, and a backing block abutting one of said discs, a conductor connected to one of said discs for transmitting the signal from said sensing means, and a single bell-shaped spring employing a shape factor of only one predominate radial mode of extension for applying pressure to said sensing means, said spring, backing block, and one of said piezoelectric discs being provided with a central aperture through which said conductor passes axially of said pick-up device, whereby axial symmetry is imparted to said pick-up device to prevent spurious resonances.

4. A vibration pick-up device of the inertia driven variety for detecting the vibrational characteristics of a vibrating body comprising; a housing, means to transmit mechanical vibrations from said body to the housing, inertia driven sensing means within said housing for converting said mechanical vibrations into an electrical signal, said sensing means including two bipolar discs of piezoelectric material symmetrically arranged, the positive poles of said discs being placed in juxtaposition whereby the negative poles thereof are outermost to provide shielding against stray electrical fields, and a backing block abutting one of said discs, a conductor connected to one of said discs for transmitting the signal from said sensing means, and a single bell-shaped spring employing a shape factor of only one predominate radial mode of extension for applying pressure to said sensing means, said spring, backing block, and one of said piezoelectric discs being provided with a central aperture through which said conductor passes axially of said pick-up device, whereby axial symmetry is imparted to said pick-up device to prevent spurious resonances.

5. A vibration pick-up device of the inertia driven variety for detecting the vibrational characteristics of a vibrating body comprising; a housing, means to transmit mechanical vibrations from said body to the housing, sensing means within said housing for converting said mechanical vibrations into an electrical signal, a conductor for transmitting the signal from said sensing means, and a single bell-shaped spring for applying pressure to said sensing means, said bell-shaped spring being provided with stiffened sidewalls to impart a shape factor of only one predomonate radial mode of extension thereto, whereby said spring is responsive only to forces applied axially of said pick-up device.

6. The invention according to claim 3 wherein said bell-shaped spring includes an upper flange seated against said housing and a bowl-shaped section depending from said upper flange, the lower surface of said bowl-shaped section abutting said backing block, said bowl-shaped section having stiffened sidewalls of a thickness greater than that of the lower surface of said section, whereby a shape factor of only one predominate radial mode of extension is imparted to said bell-shaped spring.

References Cited in the file of this patent
UNITED STATES PATENTS

| | | |
|---|---|---|
| 2,096,826 | Schrader | Oct. 26, 1937 |
| 2,411,401 | Welch | Nov. 19, 1946 |
| 2,947,889 | Rich | Aug. 2, 1960 |
| 3,060,333 | Bradley | Oct. 23, 1962 |
| 3,075,098 | Shoor | Jan. 22, 1963 |
| 3,075,099 | Shoor | Jan. 22, 1963 |